United States Patent [19]

Lénberg

[11] 4,184,267
[45] Jan. 22, 1980

[54] COMPASS HAVING A COURSE DIRECTING POINTER

[76] Inventor: Rustan Lénberg, Kungsportsavenyen 43, Gothenburg, Sweden, 41136

[21] Appl. No.: 912,721

[22] Filed: Jun. 5, 1978

[30] Foreign Application Priority Data

Jun. 7, 1977 [SE] Sweden .............................. 7706586

[51] Int. Cl.² .............................................. G01C 9/00
[52] U.S. Cl. ...................................................... 33/349
[58] Field of Search ........................... 33/349, 355, 356

[56] References Cited

U.S. PATENT DOCUMENTS

| 1,332,027 | 2/1920 | Bunker | 33/349 |
| 2,855,696 | 10/1958 | Griswold | 33/349 |

FOREIGN PATENT DOCUMENTS

| 4761 | of 1912 | United Kingdom | 33/349 |
| 191698 | 6/1922 | United Kingdom | 33/356 |

*Primary Examiner*—Harry N. Haroian
*Attorney, Agent, or Firm*—Cantor and Singer

[57] ABSTRACT

A compass is provided with a course indicated pointer, rotatable about the same center as the compass card, and frictionally engaging the same. A mechanism, including a finger for catching the pointer, is provided for adjusting the pointer to any selected position, and, while doing so, braking the card so the action of the finger overrules the frictional engagement between the finger and the card.

6 Claims, 7 Drawing Figures

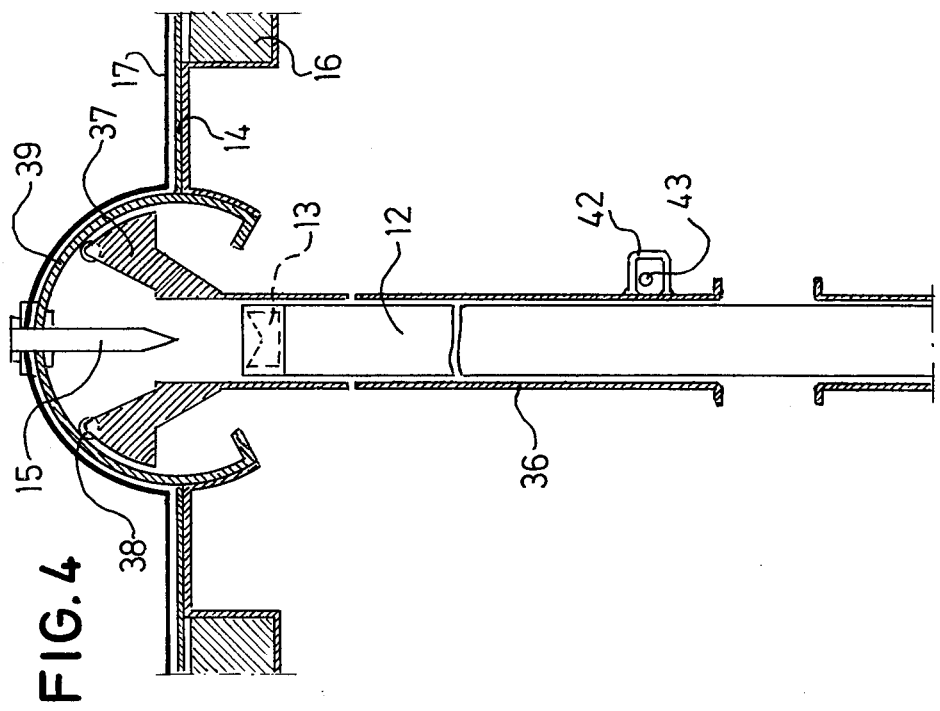
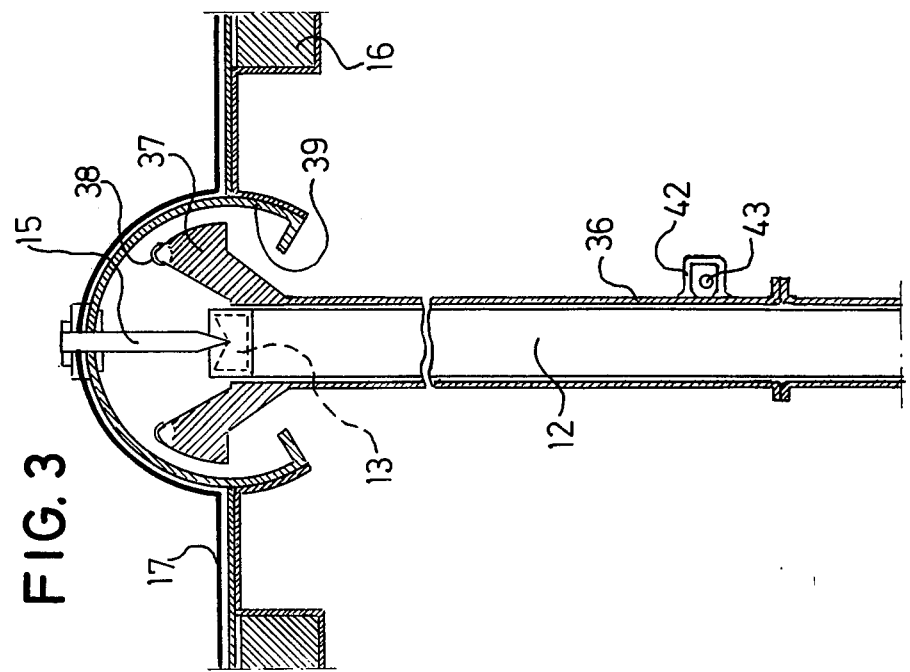

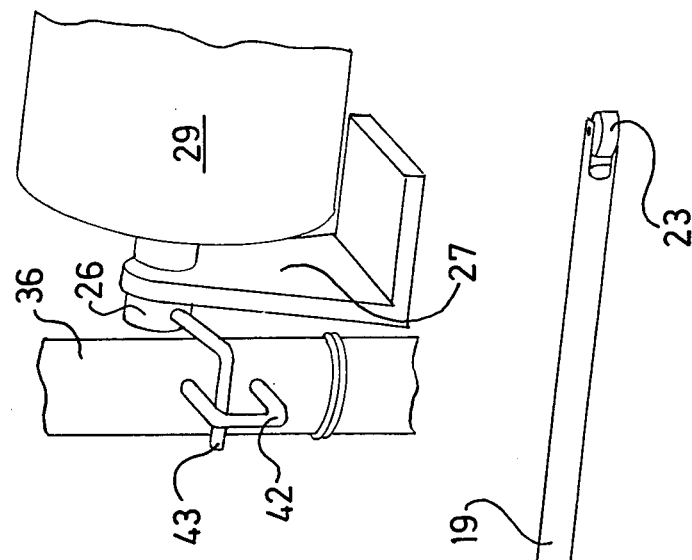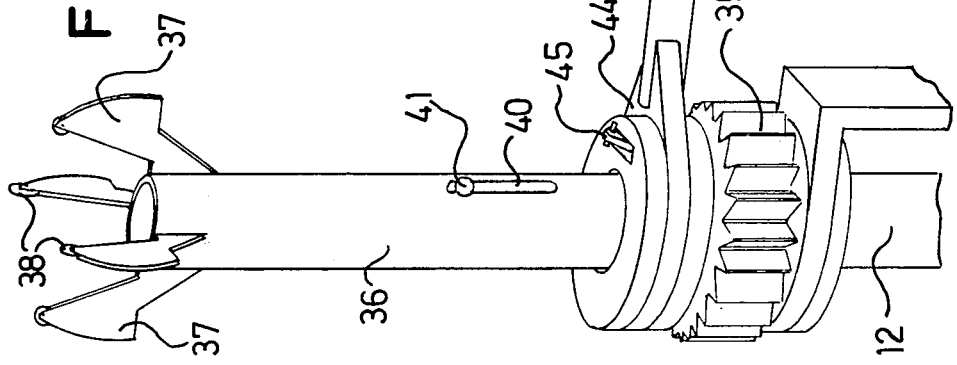

COMPASS HAVING A COURSE DIRECTING POINTER

BACKGROUND OF THE INVENTION

The present invention refers to compasses, especially compasses suited to be used in ships. The aim of the invention is to facilitate navigation by providing the compass with a pointer, which is easily set according to the determined course, and which immediately will indicate any deviation therefrom.

A conventional compass is provided with a card rotatable about a central pivot fitted in a casing, and being operated by a magnet. A course directing pointer, rotatable about the same center as the card may be provided, but known arrangements have proven difficult in practical use.

One aim of the present invention is to facilitate the operation of the pointer and to make navigation more easy.

SUMMARY OF THE INVENTION

The invention is characterized in that the journal is mounted at the upper end of a pillar centrally located in the housing of the compass and that the finger is fitted upon an arm rotatable about the pillar and being operable by means of a mechanism extending outside the housing and being adapted to lift the card from its journal and to retain the card, while the pointer is being rotated in relation thereto.

A gearing for transferring movements from the handle to the arm preferably has a gear ratio being selected so about one quarter of a revolution of the handle will bring about a full revolution at the arm.

A rotatable shaft connected to the handle and extending radially inwards towards the pillar is, in a liquid filled compass, preferably enclosed by a sleeve of elastic material, which at one end is fluid-tightly connected to the housing of the compass, while its other end is fluid-tightly and non-rotatably attached to the shaft.

The housing of the compass is preferably internally provided with a track, running concentrically around the pillar and forming a guide for the extending end of the arm, the length of the arm being telescopically adjustable, and the radial distance of the track from the pillar being selected so the arm, except during a short portion of its extension, will maintain the finger sufficient close to the card to make the finger catch the pointer.

The pointer normally follows the movements of the card by a frictional grip and means are provided for temporarily locking the card against rotation, during adjustment of the pointer.

BRIEF DESCRIPTION OF THE DRAWINGS

FIG. 3 shows a detail of the pivot carrying the card,

FIG. 4 shows the same detail, while the card is lifted for rotation of the pointer, FIG. 5 is a perspective view of the central pillar and the arm, FIG. 6 shows a detail of the rotating mechanism with means for lifting the card, and FIg. 7 shows a detail of a retaining mechanism.

DESCRIPTION OF THE PREFERRED EMBODIMENT

Figure 1:
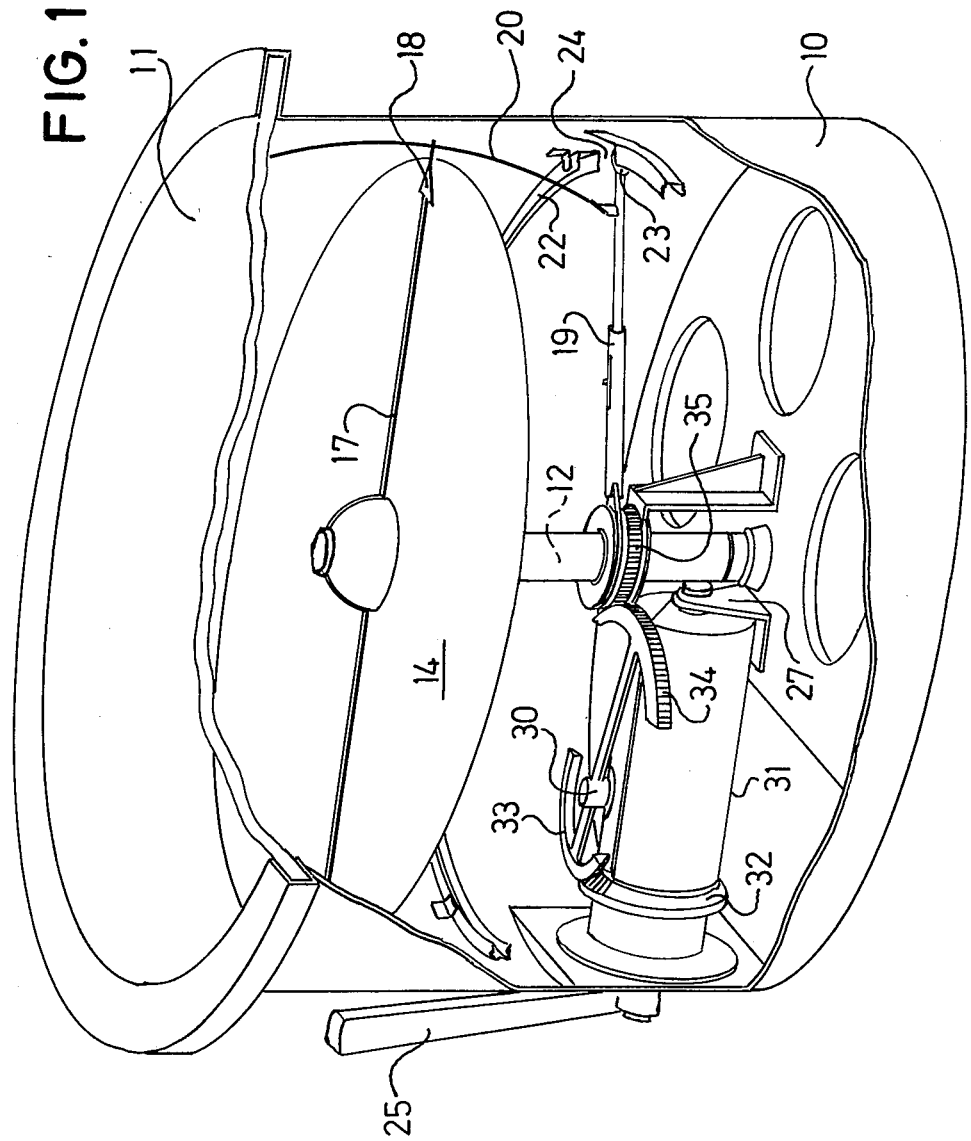
FIG. 1 shows, partly in section, a perspective view of the compass.
Figure 2:
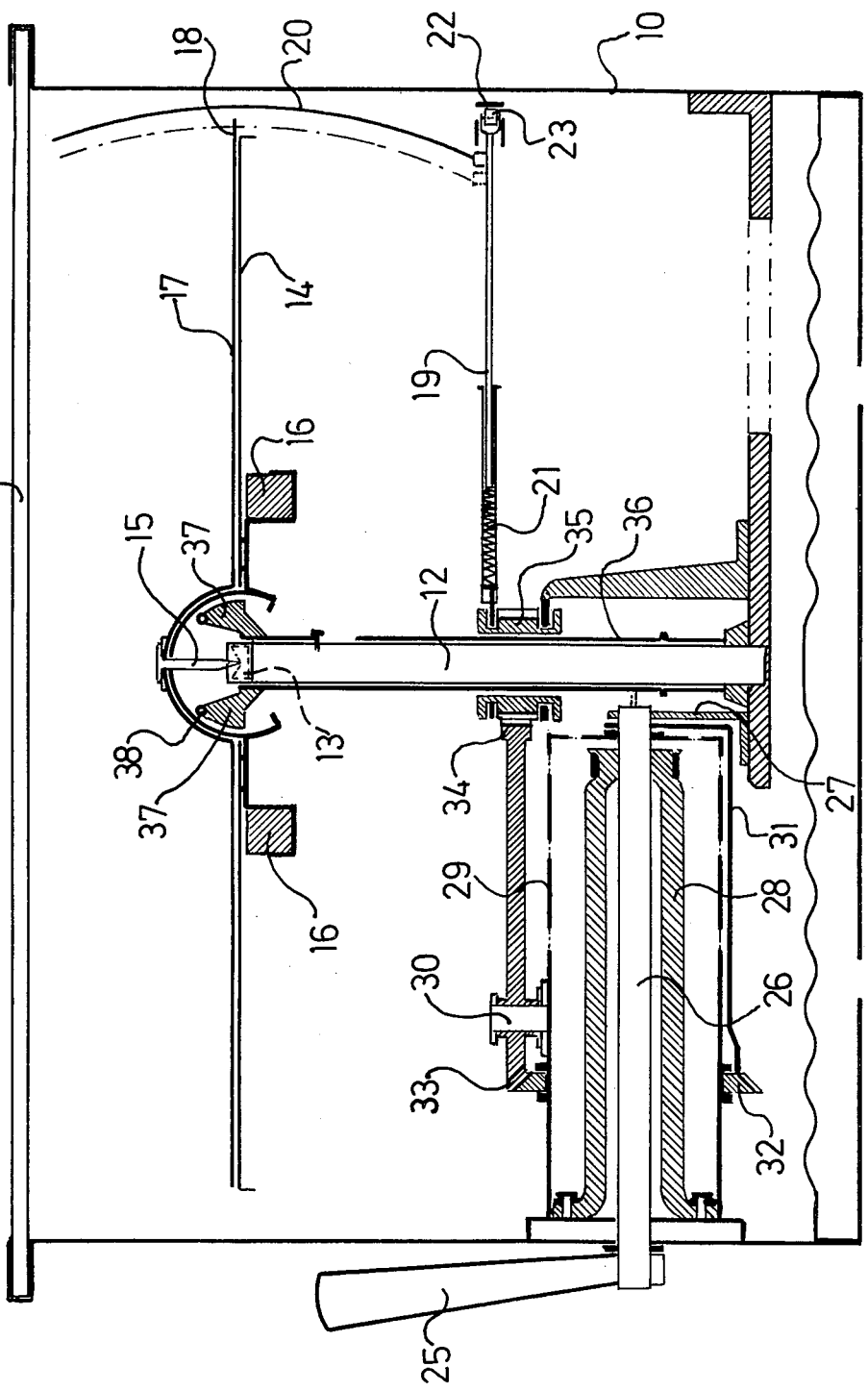
FIG. 2 shows a vertical section through the compass.

The compass shown in FIGS. 1 and 2 comprises a cylindrical housing 10 provided with means (not shown) for mounting at a suitable support. The compass is, in conventional manner filled with a liquid, and is provided with a transparent lid 11. A pillar 12 is fitted centrally in the housing and is upwardly terminated by a funnel-shaped insert 13. A plate carrying the compass card 14 rests by a pin 15 upon this insert, so it will be freely rotatable under the influence of an annular magnet 16, which is attached to the underside of the card. This journalling permits undisturbed movements, independently of possible inclinations at the support the card is maintaining a horizontal position.

A pointer 17, formed like an arrow is also mounted upon pin 15 and is rotatable in relation to card 14, but will normally follow the movements of the latter due to frictional engagement. Pointer 17 is so long, that its pointed end 18 reaches outside the periphery of card 14.

For rotating pointer 17 in relation to card 14 a mechanism is provided, which comprises a telescopically extendible arm 19 and a finger 20 projecting upwards from the latter. The parts of the arm are biased by a spring 21 towards an extended position.

The arm is rotatable about pillar 12, and the housing 10 of the compass is internally provided with a peripherally running track 22 adapted to cooperate with arm 19. The latter is, at its end remote from the pillar, provided with a trundle 23, which runs along the track. The radial distance of the track from the pillar is selected so arm 19, except during a short portion of the circumference of the track, will be compressed, against the action of spring 21, so it will bring the finger so close to the card 14, that the finger will catch the projecting end 18 of pointer 17.

A catching position is in FIG. 1 shown in full lines, whereas in FIG. 2 the free position of the finger is shown in full lines, and the catching position in dotted lines.

In order to make possible this change of the length of the arm, track 22 is open over a very short portion 24, and one end of the track is, adjacent to the opening, formed with an oblique path, where trundle 23, upon rotation of the arm, will run up to the track proper. When mounting the compass in the ship this opening should preferably be directed straight towards the stem.

For rotating arm 19 a mechanism is provided, which comprises a handle 25 available outside the housing and a number of gear wheels and gear sectors, where the exchange ratio is selected in such a manner, that a quarter of one revolution at handle 25 will cause a full revolution of arm 19.

Handle 25 is mounted upon a shaft 26, which extends radially inwards, towards pillar 12, and is journalled in a bracket 27 close by the pillar.

As the compass housing is filled with a liquid it is essential to provide a sealing around shaft 26. In order to avoid a rotating sealing element shaft 26 is enclosed in a sleeve 28 of resilient material, for instance silicon rubber, which is inert in relation to such fluids as are commonly used in compasses. This sleeve is sealingly attached to the wall of the compass housing, around the opening where shaft 26 enters the housing. The other end of the sleeve is fluid-tightly and non-rotatably attached to the inward end of the shaft. When the shaft is rotated the sleeve will simultaneously be twisted. This arrangement will function satisfactorily as it is not necessary to turn the shaft more than a quarter of a revolution.

Shaft 26 and sleeve 28 are enclosed in a stationary tube structure 29, which carries an upwardly directed trunnion 20. An axially slotted cylinder 31 is non-rotatably connected to the inward end of shaft 26, and extends radially outwards, concentrically enclosing sleeve 29, and carrying a gear wheel 32. The slot in the cylinder makes is possible to rotate cylinder 31 in relation to sleeve 29, in spite of the extending trunnion 30.

The latter carries a gear member, comprising two gear sectors 33 and 34. Sector 33 is adapted to cooperate with gear wheel 32, and sector 34 cooperates with a further gear wheel 35 being concentric with pillar 12 and upon which arm 19 is mounted. It is evident that a rotation of handle 25 in this matter will be transferred into a movement at arm 19, and that the exchange ratio of this movement may be selected in any suitable manner.

As pointer 17 normally follows card 14 due to frictional engagement it is necessary that the card be braked when the pointer is to be rotated. As is best shown in FIGS. 3 and 4 pillar 12 is surrounded by an axially displaceable sleeve 36, which is upwardly terminated by a four-armed mount 37. Each arm carries, at its free end, a small wheel 38, and the mount is formed to fit into a part-spherical center body 39 supporting card 14, and may engage said body independently of card 14 occasionally occupying a slanting position in relation to the pillar.

Sleeve 36 is provided with an axial slot 40 and pillar 12 has a peg 41, cooperating with said slot. This ensures an axial relative movement between sleeve and pillar, but prevents angular movement between said components.

Sleeve 36 is further provided with a sidewardly directed ear 42, and shaft 26 is, as is best shown in FIG. 6, provided with a crank member 43, which will lift the sleeve when shaft 26 is rotated. When finger 20 is brought into catching position and arm 19 is rotated, card 14 will be lifted so it is prevented from rotation in relation to center pin 15.

Arm 19 shall be rotated one revolution, as a maximum, and shall then be brought back to its rest position. The elastic sleeve 28 will permit a limited movement only, and will aid in bringing the arm back. A hub 44 of the arm cooperates with a pawl 45 at the pillar, which prevents rotation past a given position, which is located just before the arm would reach opening 24 in track 22 when turned in one direction.

The arrangement operates in the following manner. When the ship has been put upon its selected course pointer 17 is rotated in relation to card 14 so the pointer will be directed to the selected compass point, whereupon arm 19 is returned to its rest position in opening 24 in track 22, where finger 20 will no longer contact the extending end 18 of the pointer.

The compass is, as usual, mounted in the longitudinal middle line of the ship, which permits the helmsman to lay a sight line across some mark, preferably the stem of the ship. Instead of, as usual, having to remember a certain selected degree number, and to check this in relation to the sight line, which may be difficult for instance during darkness, it is now only necessary to observe that pointer 17 does not deviate from the sight line.

A desired change in the course will rapidly and simply be transferred to pointer 17 by operating handle 25.

The embodiment shown is, as mentioned above, an example only, and the components may be varied in many ways within the scope of the appended claims, as is called for by the basic shape of the compass.

What I claim is:

1. A compass comprising:
   (A) a housing having a central upstanding pillar and bearing means at the upper end of said pillar;
   (B) a rotatable card;
   (C) means for carrying said card in relation to said bearing means;
   (D) a pointer, and means for supporting same for rotation about said bearing means and with a frictional engagement to said card, at least one end of said pointer extending past the periphery of said card;
   (E) an arm having a sleeve at one end thereof, said sleeve concentrically enclosing said pillar below said card;
   (F) means for rotating said sleeve in relation to said pillar, said rotating means having a handle disposed outside said housing;
   (G) a finger extending from the end of said arm remote from said pillar and reaching up above said card; and
   (H) means at said sleeve for lifting said card from said bearing means during a rotational movement of said lifting means.

2. The compass according to claim 1, in which said rotating means includes gear means for transferring movements from said handle to said arm, the gear ratio being selected so about one quarter of a revolution of the handle will bring about a full revolution at the arm.

3. The compass according to claim 1, in which said rotating means includes a rotatable shaft extending radially inwards towards said pillar, said shaft being enclosed by a sleeve of elastic material, which at one end is fluid-tightly connected to said housing of the compass, while its other end is fluid-tightly and non-rotatably attached to said shaft.

4. The compass according to claim 1, in which said housing is internally provided with a track, running concentrically around said pillar, and forming a guide for the distal end of said arm, said arm comprising two telescopically sliding parts being biased towards an extended position, the radial distance of said track from said pillar being selected so said arm, except during a short portion of the extension of said track, will maintain said finger sufficient close to said card, to make said finger catch said pointer.

5. The compass according to claim 4 further having means for temporarily locking said card against rotation, during adjustment of the pointer.

6. The compass according to claim 5, in which said card and said pointer both have a part-spherical center portion in which a pivot pin is mounted, the means for locking said card comprising a multi-armed mount at the upper end of said sleeve, said mount having means for engaging the inner face of said part-spherical portion of said card while lifting said card.

* * * * *